United States Patent
Dou et al.

(10) Patent No.: US 12,025,816 B2
(45) Date of Patent: Jul. 2, 2024

(54) VIEWING ANGLE DIFFUSER FILM AND DISPLAY PANEL

(71) Applicant: TCL CHINA STAR OPTOELECTRONICS TECHNOLOGY CO., LTD., Guangdong (CN)

(72) Inventors: Hu Dou, Guangdong (CN); Ziping Wu, Guangdong (CN); Gang Yu, Guangdong (CN)

(73) Assignee: TCL CHINA STAR OPTOELECTRONICS TECHNOLOGY CO., LTD., Guangdong (CN)

( * ) Notice: Subject to any disclaimer, the term of this patent is extended or adjusted under 35 U.S.C. 154(b) by 574 days.

(21) Appl. No.: 17/288,973

(22) PCT Filed: Mar. 31, 2021

(86) PCT No.: PCT/CN2021/084590
§ 371 (c)(1),
(2) Date: Apr. 27, 2021

(87) PCT Pub. No.: WO2022/198706
PCT Pub. Date: Sep. 29, 2022

(65) Prior Publication Data
US 2022/0357489 A1    Nov. 10, 2022

(30) Foreign Application Priority Data

Mar. 25, 2021 (CN) .......................... 202110320939.6

(51) Int. Cl.
*G02B 5/02* (2006.01)
*G02F 1/1335* (2006.01)

(52) U.S. Cl.
CPC ......... *G02B 5/0215* (2013.01); *G02B 5/0278* (2013.01); *G02F 1/133504* (2013.01)

(58) Field of Classification Search
CPC .. G02B 5/0257; G02B 5/0215; G02B 5/0231; G02B 5/0278
See application file for complete search history.

(56) References Cited

U.S. PATENT DOCUMENTS

| 2014/0078582 A1 | 3/2014 | Cho |
| 2015/0102328 A1* | 4/2015 | Shin ..................... G02B 5/0215 359/488.01 |
| 2019/0122597 A1 | 4/2019 | Lee et al. |

FOREIGN PATENT DOCUMENTS

| CN | 101865419 A | 10/2010 |
| CN | 102132175 A | 7/2011 |
| CN | 202512257 U | 10/2012 |

(Continued)

*Primary Examiner* — Ryan D Howard
(74) *Attorney, Agent, or Firm* — Rivka Friedman (57) ABSTRACT

The present invention provides a viewing angle diffuser film and a display panel, including a base substrate and refractive protrusions. By setting space ratios of adjacent refractive protrusions in a first direction and a second direction, refraction directions of the viewing angle diffuser film can be controlled, and therefore light diffusion effects can be controlled. In the display panel of the present invention, the space ratios of the refractive protrusions in different directions are adjusted according to different usage scenarios to improve display brightness and reduce color shifts.

14 Claims, 5 Drawing Sheets

(56) References Cited

FOREIGN PATENT DOCUMENTS

| | | | |
|---|---|---|---|
| CN | 104865740 | A | 8/2015 |
| CN | 104991370 | A | 10/2015 |
| CN | 105068298 | A | 11/2015 |
| CN | 205015497 | U | 2/2016 |
| CN | 107329325 | A | 11/2017 |
| CN | 109188772 | A | 1/2019 |
| CN | 109358447 | A | 2/2019 |
| CN | 208721822 | U | 4/2019 |
| CN | 110352319 | A | 10/2019 |
| CN | 110824770 | A | 2/2020 |
| CN | 112147726 | A | 12/2020 |
| TW | I262327 | B | 9/2006 |
| WO | 2012157517 | A1 | 11/2012 |
| WO | 2020155279 | A1 | 8/2020 |

\* cited by examiner

VIEWING ANGLE DIFFUSER FILM AND DISPLAY PANEL

FIELD OF DISCLOSURE

The present invention relates to a field of display technology and in particular to a viewing angle diffuser film and a display panel.

DESCRIPTION OF PRIOR ART

With the rapid development of display technology, there is a growing trend for high-resolution liquid crystal display panels. An increase in resolution of liquid crystal display panels causes a decrease in an aperture ratio of pixel electrodes, so light transmittance is lowered, thus negatively affecting display brightness of the liquid crystal display panels at large viewing angles.

In conventional techniques, display brightness of liquid crystal display panels at large viewing angles is improved by adding a viewing angle diffuser film to the liquid crystal display panels. A two-dimensional dot-matrix wide-viewing angle film can alleviate a moiré effect. However, conventional two-dimensional dot-matrix wide-viewing angle films have no priority direction for light diffusion and have basically same light diffusion ability in all directions. Light diffusion in unnecessary directions will cause energy waste and loss of front-view brightness.

Therefore, there is an urgent need to develop a new type of viewing angle diffuser film to preserve positive effects of the conventional viewing angle diffuser films and to eliminate negative effects of the conventional viewing angle diffuser films.

SUMMARY

It is an object of the present invention to provide a viewing angle diffuser film, which can control refraction directions of the viewing angle diffuser film and further control light diffusion effects by setting space ratios of the adjective refractive protrusions in a first direction and a second direction.

Accordingly, the present invention provides a viewing angle diffuser film, comprising: a base substrate; and a plurality of refractive protrusions arranged spaced apart from each other on the base substrate and defining first intervals in a first direction and second intervals in a second direction; wherein the first intervals are larger than the second intervals.

Furthermore, the refractive protrusions have a first space ratio and a second space ratio; the first space ratio is a ratio of a first lower base substrate length of each of the refractive protrusions along the first direction to a sum of the first lower base substrate length and the corresponding first interval; and the second space ratio is a ratio of a second lower base substrate length of each of the refractive protrusions along the second direction to a sum of the second lower base substrate length and the corresponding second interval.

Furthermore, the first space ratio ranges from 0.5 to 1.

Furthermore, the second space ratio ranges from 0.1 to 0.8.

Furthermore, a planar pattern of each of the refractive protrusions comprises a circular shape or an elliptical shape; and each of the refractive protrusions having the elliptical shape comprises a major axis parallel to the second direction and a minor axis parallel to the first direction.

Furthermore, the base substrate is integrally formed with the refractive protrusions.

Furthermore, the refractive protrusions are arranged in a plurality of sets along the second direction, and adjacent sets of the refractive protrusions comprise different numbers of the refractive protrusions.

Furthermore, the refractive protrusions are arranged in an array on the base substrate.

Furthermore, the viewing angle diffuser film further comprises: a protective layer arranged on the base substrate and the refractive protrusions.

The present invention provides a display panel, comprising: a display screen and a viewing angle diffuser film, the viewing angle diffuser film arranged on a light emitting side of the display screen.

The present invention provides the viewing angle diffuser film and the display panel. By setting the space ratios of the adjacent refractive protrusions in the first direction and the second direction, refraction directions of the viewing angle diffuser film can be controlled, and therefore light diffusion effects can be controlled. In the display panel of the present invention, the space ratios of the refractive protrusions in different directions are adjusted according to different usage scenarios, thereby improving display brightness and reducing a color shift.

BRIEF DESCRIPTION OF DRAWINGS

The present application is described in detail below in conjunction with the accompanying drawings for ease of understanding the technical solutions and other beneficial effects of the present application.

DETAILED DESCRIPTION OF EMBODIMENTS

The specific structures and functional details disclosed herein are only representative examples, and are provided for the purpose of describing example embodiments of the present application. However, the present application can be embodied in many alternative forms, and should not be construed as being limited only to the embodiments set forth herein.

In the description of the present application, it should be understood that directional terms, such as "center", "lateral", "upper", "lower", "left", "right", "vertical", "horizontal", "top", "bottom", "inner", and "outer", are for the convenience of describing the present application and simplifying the description based on the orientation or positional relationship shown in the drawings. The directional terms do not indicate or imply that a device or an element must have a specific orientation, be constructed and operated in a specific orientation, and therefore cannot be construed as a limitation of the present application. In addition, the terms "first" and "second" are for illustrative purposes only, and cannot be interpreted to indicate or imply relative importance or implicitly indicate the number of indicated technical features. Thus, the features defined with "first" and "second" may explicitly or implicitly include one or more of these features. In the description of the present application, unless otherwise specified, "multiple" means two or more. In addition, the term "comprising" and any variations thereof is intended to cover non-exclusive inclusion.

First Embodiment

Figure 1:
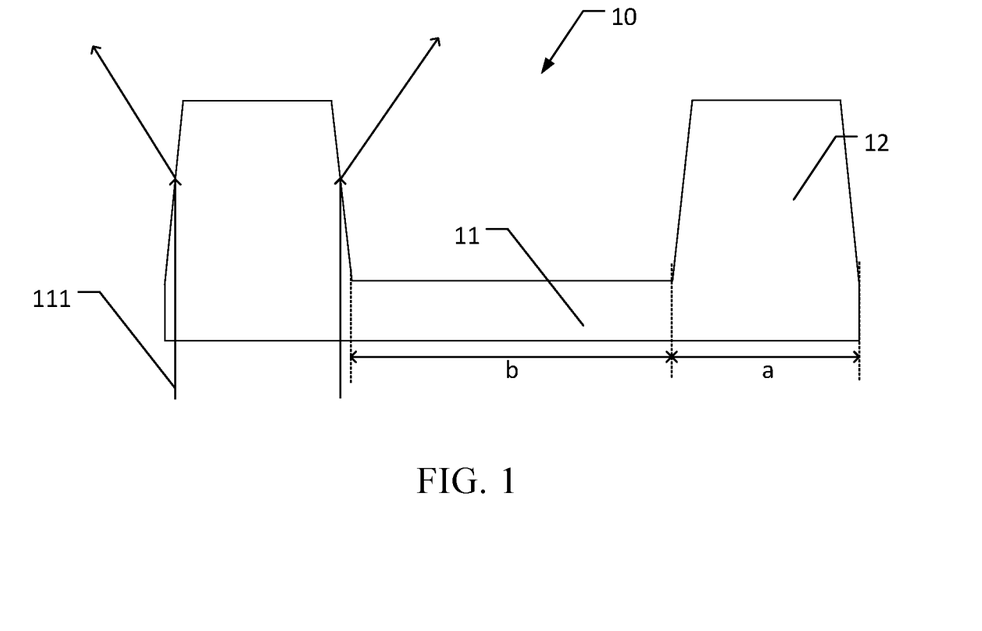
FIG. 1 is a side view along a first direction, illustrating a viewing angle diffuser film according to a first embodiment of the present invention.
Figure 2:
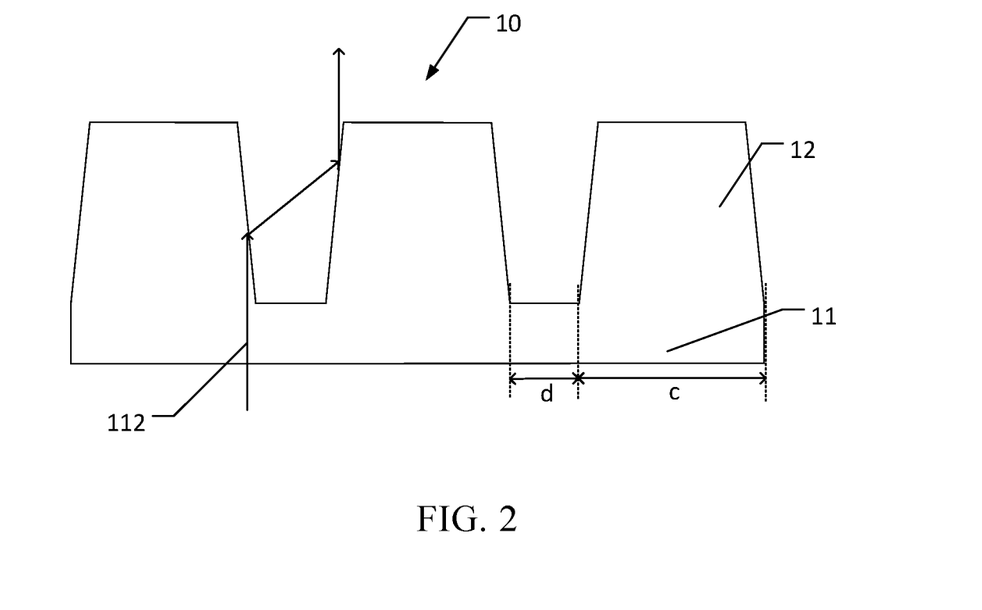
FIG. 2 is a side view along a second direction, illustrating the viewing angle diffuser film according to the first embodiment of the present invention.

Referring to FIGS. 1 and 2, the present invention provides a viewing angle diffuser film 10 according to the first embodiment, comprising a base substrate 11 and a plurality of refractive protrusions 12.

The refractive protrusions 12 arranged at intervals on the base substrate 11 and defining a first interval b (as shown in FIG. 1) in a first direction and a second interval d (as shown in FIG. 2) in a second direction. The first direction is perpendicular to the second direction. The first interval b is larger than the second interval d.

In the first embodiment, as shown in FIGS. 1 and 2, the first direction is a transverse direction; that is, an X direction; the second direction is a longitudinal direction, that is, a Y direction. Of course, in other embodiments, the first direction can be the longitudinal direction, and the second direction can be the transverse direction. Therefore, the first direction and the second direction can be selectively set to the longitudinal direction or the transverse direction according to light refraction directions and light emitting effects required in actual situations.

The refractive protrusions 12 have a first space ratio and a second space ratio. The first space ratio is greater than the second space ratio.

The first space ratio is a ratio of first lower base substrate length a of each of the refractive protrusions 12 along the first direction to a sum of the first lower base substrate length a and the corresponding first interval b. The first space ratio is obtained using a calculation formula: a/(a+b). In the present embodiment, the first space ratio ranges from 0.5 to 1. As shown in FIG. 1, light 111 can diffuse along the first direction.

The second space ratio is a ratio of a second lower base substrate length c of each of the refractive protrusions 12 along the second direction to a sum of the second lower base substrate length c and the corresponding second interval d. The second space ratio is obtained using a calculation formula: c/(c+d). In the present embodiment, the second space ratio ranges from 0.1 to 0.8. As shown in FIG. 2, although light 112 is emitted out normally, light diffusing effects of the light 112 are weaker.

Figure 3:
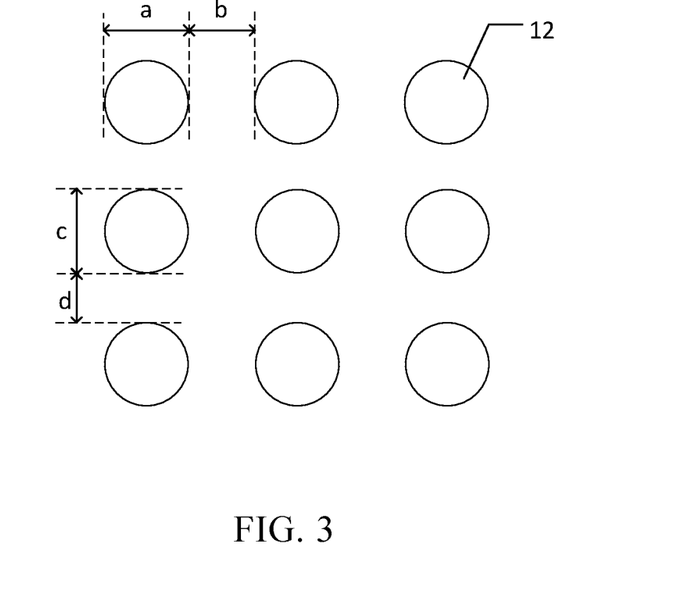
FIG. 3 is a schematic plan view of a circular pattern of the viewing angle diffuser film according to the first embodiment of the present invention.
Figure 4:
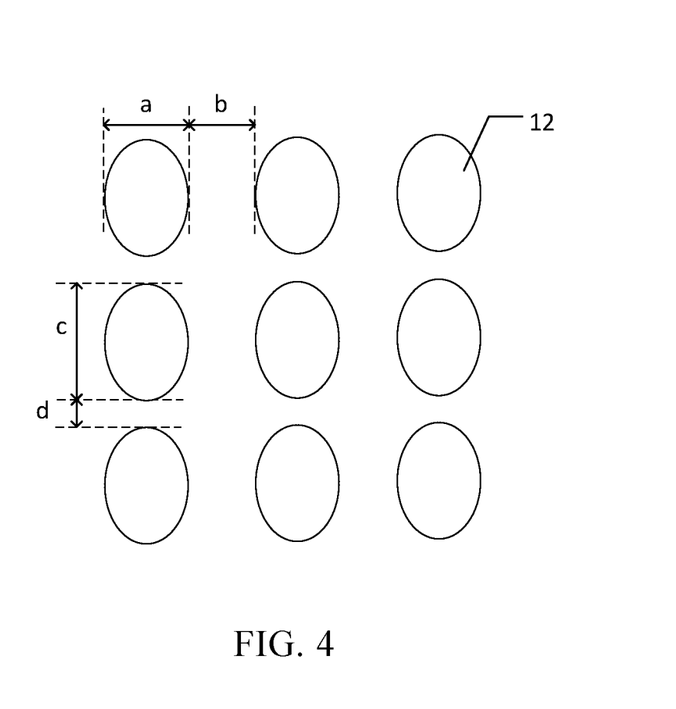
FIG. 4 is a schematic plan view of an elliptical pattern of the viewing angle diffuser film according to the first embodiment of the present invention.
Figure 5:
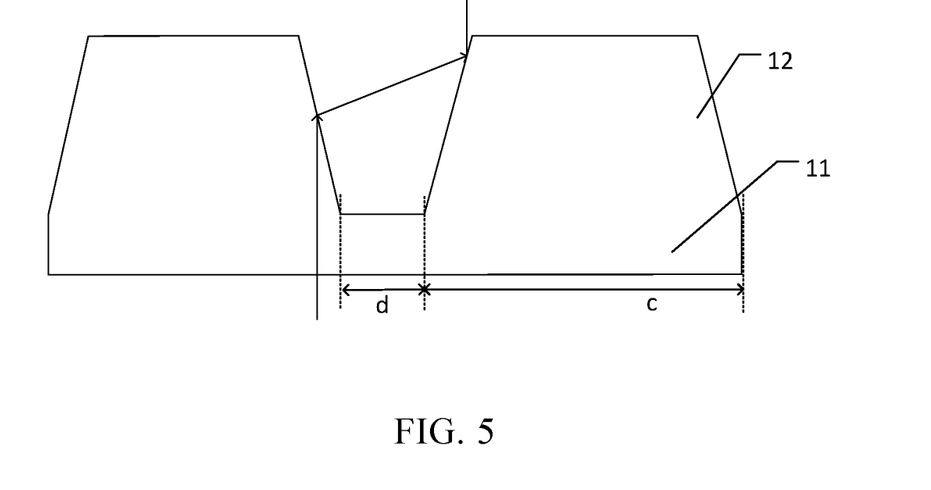
FIG. 5 is a side view along the second direction, illustrating the viewing angle diffuser film according to the embodiment of FIG. 4.
Figure 6:
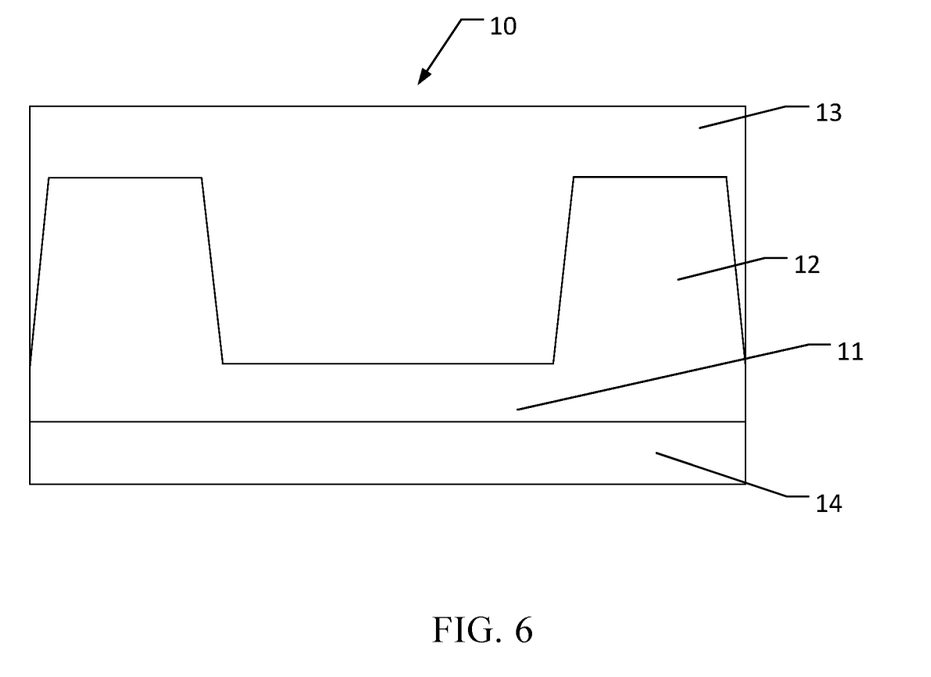
FIG. 6 is a schematic structural view illustrating the viewing angle diffuser film according to the first embodiment of the present invention.

In the first embodiment, the refractive protrusions 12 are arranged in an array on the base substrate 11, and a planar pattern of each refractive protrusion 12 comprises a circular shape (as shown in FIG. 3) or an elliptical shape (as shown in FIG. 4, a minor axis of the elliptical shape is equal to a diameter of the circular shape), wherein a major axis of the elliptical refractive projection is parallel to the second direction, and the minor axis of the elliptical refractive projection is parallel to the first direction. If the first space ratio of the refractive protrusions 12 in the transverse direction is greater than the second space ratio of the refractive protrusions 12 in the longitudinal direction, the first space ratio of the refractive protrusions 12 in the transverse direction ranges from 0.5 to 1 (the calculation formula is: a/(a+b)), the second space ratio of the refractive protrusions 12 in the longitudinal direction ranges from 0.1 to 0.8 (the calculation formula is: c/(c+d)). In the present embodiment, the first space ratio is 0.8, and the second space ratio is 0.5. Accordingly, as shown in FIG. 1, light emitted from the refractive protrusions in the first direction is not interfered by the adjacent refractive protrusions, and therefore light diffusing effects are not affected. As shown in FIG. 2, light emitted from the refractive protrusions in the second direction is affected by the adjacent refractive protrusions, and the light diffusing effects are lowered. If the first space ratio of the refractive protrusions 12 in the transverse direction is less than the second space ratio of the refractive protrusions 12 in the longitudinal direction, then the first space ratio of the refractive protrusions 12 in the longitudinal direction ranges from 0.5 to 1, and the second space ratio of the refractive protrusions 12 in the transverse direction ranges from 0.1 to 0.8. In the embodiment of FIG. 3, a is equal to c, and b is greater than d (b>d). In the embodiment of FIG. 4, a is not equal to c, and b is greater than d (b>d). A plurality of sets of the refractive protrusions arranged along the second direction are provided, wherein adjacent sets of the refractive protrusions have a same number of the refractive protrusions. As shown in FIG. 5, FIG. 5 is a side view showing the pattern of FIG. 4 along the second direction. The embodiment of FIG. 4 has a side view along the first direction, which is the same as FIG. 1 (i.e., a length of the minor axis of the elliptical pattern is equal to the diameter of the circular pattern); and the embodiment of FIG. 4 has a side view along the second direction, which is different from FIG. 2, wherein the difference is the lower base substrate length c of the refractive protrusion of FIG. 4 is increased, so that a small interval arrangement of the refractive protrusions in the second direction can be realized, and then in the second direction, the light emitted from the refractive protrusions is affected by the adjacent refractive protrusions to thereby reduce the light diffusing effects.

In the first embodiment, the refractive protrusions 12 are used to change propagation directions of the light entering the viewing angle diffuser film 10, and by means of light refraction, a portion of the light is directed away from a center of the viewing angle diffuser film 10, thereby enhancing the brightness at large viewing angles.

In the first embodiment, a width of a top surface 123 of the refractive protrusion 12 can be 3 to 10 micrometers, a width of a bottom surface of the refractive protrusion 12 can be 12 to 20 micrometers, and a height of the refractive protrusion 12 can be 15 to 25 micrometers. The width of the top surface 123 of the refractive protrusion 12 can be 6 micrometers, the width of the bottom surface of the refractive protrusion 12 can be 18 micrometers, and the height of the refractive protrusion 12 can be 21 micrometers.

In the first embodiment, as shown in FIG. 5, the viewing angle diffuser film 10 further comprises a protective layer 13 provided on the refractive protrusions 12 and the base substrate 11. The protective layer 13 is made of a transparent material and is used to protect the refractive protrusions 12.

In the first embodiment, the viewing angle diffuser film 10 further comprises a polarizing film layer 14, and the polarizing film layer 14 is disposed on one side of the base substrate 11 away from the refractive protrusions 12. It should be noted that, combination of the refractive protrusions 12 with the polarizing film layer 14 allows the viewing angle diffuser film 10 to serve as a wide-viewing-angle polarizer, so that the viewing angle diffuser film 10 can replace a polarizer of a conventional display panel.

In the first embodiment, the base substrate 11 and the refractive protrusion 12 are integrally formed to reduce manufacturing steps and reduce costs. A cross-section of the refractive protrusion 12 comprises a trapezoidal shape. In other embodiments, the cross-section of the refractive protrusion 12 can also be in the shape of a convex lens, a concave lens, an hourglass, or a water drop.

The first embodiment provides a viewing angle diffuser film 10. By setting the space ratios for the adjacent refractive protrusions 12 in the first direction and in the second direction, the refraction directions of the viewing angle diffuser film 10 can be controlled, and the light diffusing effects can be controlled.

Second Embodiment

Figure 7:
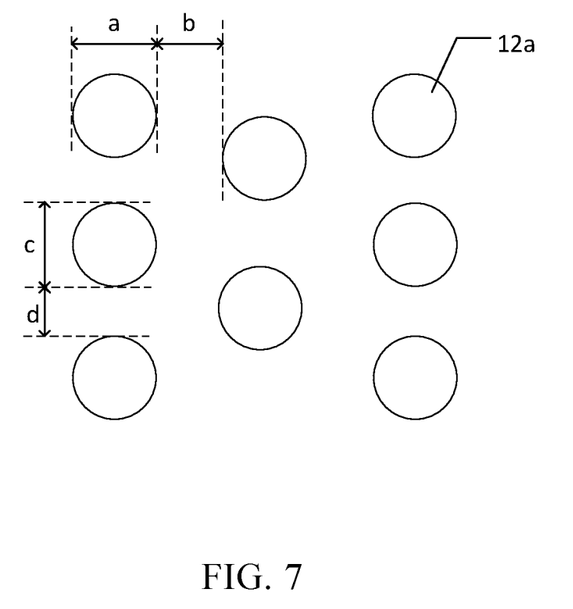
FIG. 7 is a schematic plan view illustrating the circular pattern of the viewing angle diffuser film according to a second embodiment of the present invention.
Figure 8:
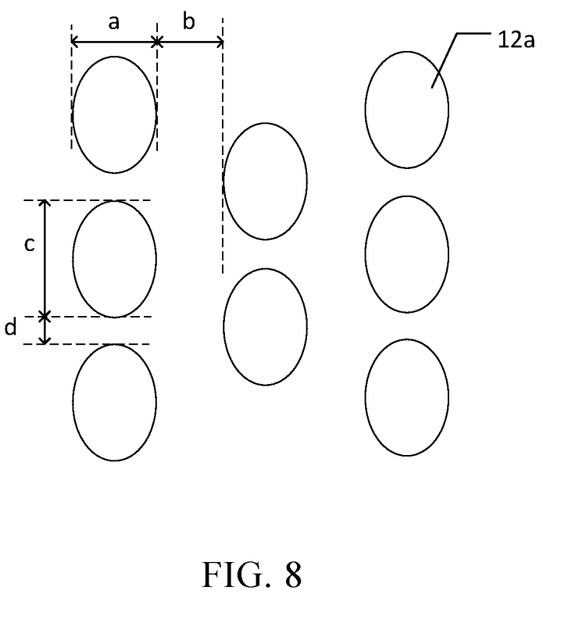
FIG. 8 is a schematic plan view illustrating the elliptical pattern of the viewing angle diffuser film according to the second embodiment of the present invention.

As shown in FIGS. 7 and 8, the second embodiment of the present invention provides a viewing angle diffuser film. The present embodiment is different from the first embodiment in that the arrangement of the refractive protrusions 12a is different.

Specifically, the numbers of the refractive protrusions 12a in the vertical direction are different, resulting in different planar patterns of the refractive protrusions 12a. The planar pattern of each refractive protrusion 12a comprises a circular shape (as shown in FIG. 7) or an elliptical shape (as shown in FIG. 8). A plurality of sets of the refractive protrusions are arranged along the second direction, wherein adjacent sets of the refractive protrusions have different numbers of the refractive protrusions. In the embodiment of FIG. 7, its side view along the first direction is the same as FIG. 1, and its side view along the second direction is the same as a side view of the viewing angle diffuser film as shown in FIG. 2. In the embodiment of FIG. 8, its side view along the first direction is the same as FIG. 1, and its side view along the second direction is the same as a side view along the second direction of the viewing angle diffuser film of the embodiment of FIG. 5.

Third Embodiment

Figure 9:
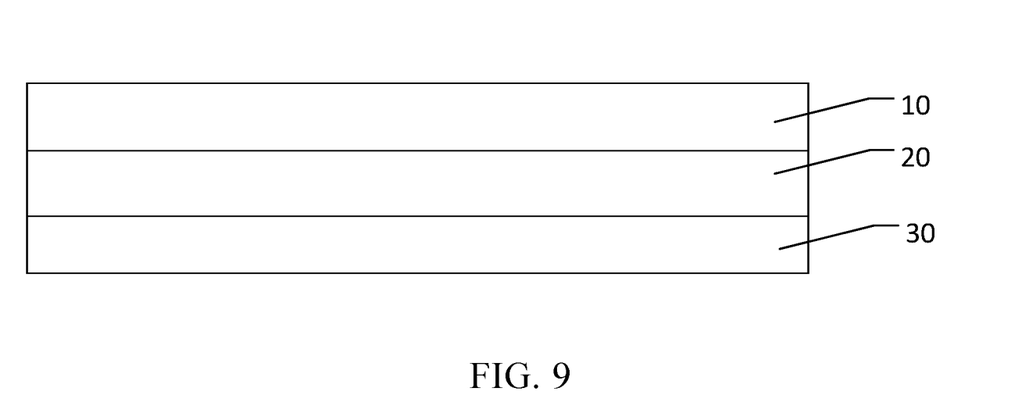
FIG. 9 is a schematic structural view illustrating a display panel according to a third embodiment of the present invention.

As shown in FIG. 9, the third embodiment of the present invention provides a display panel, comprising a display screen 20 and the viewing angle diffuser film 10. The viewing angle diffuser film 10 is disposed on a light emitting side of the display screen 20.

In the third embodiment, the display panel further comprises a backlight module 30 disposed on one side of the display screen 20 away from the viewing angle diffuser film 10.

It should be noted that according to the present invention, when the viewing angle diffuser film 10 is attached to the display screen 20, the viewing angle diffuser film 10 provides light scattering effects. Therefore, there is no need to add a scattering film in the backlight module 30, and thus production costs are reduced.

When a light beam emitted by a light source of the display panel enters the refractive protrusion 12, outgoing light rays propagate in different directions after parallel light rays are refracted at different portions on a curved surface. As a result, the viewing angle diffuser film 10 modulates an incident light beam to have multiple modulated angles, and a light modulation ability of the viewing angle diffuser film 10 is enhanced. In the case of the display panel with a relatively concentrated light shape emitted by the light source, the outgoing light rays modulated by the viewing angle diffuser film 10 are scattered to have a scattered light shape, thereby improving image quality of wide-viewing-angle display screens. When the display panel preferentially diffuses light in the horizontal direction, the first space ratio of the refractive protrusions 12 in the horizontal direction is greater than the second space ratio of the refractive protrusions 12 in the vertical direction. The first space ratio of the refractive protrusions 12 in the horizontal direction ranges from 0.5 to 1, and the second space ratio of the refractive protrusions 12 in the vertical direction ranges from 0.1 to 0.8. When the display panel preferentially diffuses light in the vertical direction, the first space ratio of the refractive protrusions 12 in the horizontal direction is less than the second space ratio of the refractive protrusions 12 in the vertical direction. The first space ratio of the refractive protrusions 12 in the vertical direction ranges from 0.5 to 1, and the second space ratio of the refractive protrusions 12 in the horizontal direction ranges from 0.1 to 0.8.

Advantages of the present invention are: the present invention provides the viewing angle diffuser film and the display panel. By setting the space ratios of the adjacent refractive protrusions in the first direction and the second direction, the refraction directions of the viewing angle diffuser film can be controlled, and therefore light diffusion effects can be controlled. In the display panel of the present invention, the space ratios of the refractive protrusions in different directions are adjusted according to different usage scenarios, thereby improving display brightness and reducing color shifts.

In summary, although the present application has been disclosed as above in preferable embodiments, the above-mentioned embodiments are not intended to limit the present application. Those of ordinary skill in the art can make various changes and modifications without departing from the spirit and scope of the present application, so the protection scope of the present application should be defined by the appended claims.

What is claimed is:

1. A viewing angle diffuser film, comprising:
   a base substrate; and
   a plurality of refractive protrusions arranged at intervals on the base substrate and defining first intervals in a first direction and second intervals in a second direction, wherein the refractive protrusions comprise a first space ratio and a second space ratio;
   the first space ratio is a ratio of a first lower base substrate length of each of the refractive protrusions along the first direction to a sum of the first lower base substrate length and the corresponding first interval;
   the second space ratio is a ratio of a second lower base substrate length of each of the refractive protrusions along the second direction to a sum of the second lower base substrate length and the corresponding second interval; and the first space ratio is greater than the second space ratio, and the first space ratio ranges from 0.5 to 1;
wherein the first intervals are larger than the second intervals.

2. The viewing angle diffuser film according to claim 1, wherein the second space ratio ranges from 0.1 to 0.8.

3. The viewing angle diffuser film according to claim 1, wherein a planar pattern of each of the refractive protrusions comprises a circular shape or an elliptical shape; and
each of the refractive protrusions having the elliptical shape comprises a major axis parallel to the second direction and a minor axis parallel to the first direction.

4. The viewing angle diffuser film according to claim 1, wherein the base substrate is integrally formed with the refractive protrusions.

5. The viewing angle diffuser film according to claim 1, wherein the refractive protrusions are arranged in an array on the base substrate.

6. The viewing angle diffuser film according to claim 5, wherein a plurality of sets of the refractive protrusions are arranged along the second direction, and adjacent sets of the refractive protrusions comprise different numbers of the refractive protrusions.

7. The viewing angle diffuser film according to claim 1, further comprising:
a protective layer arranged on the base substrate and the refractive protrusions.

8. A display panel, comprising: a display screen and a viewing angle diffuser film, the viewing angle diffuser film arranged on a light emitting side of the display screen;
wherein the viewing angle diffuser film comprises:
a base substrate; and
a plurality of refractive protrusions arranged at intervals on the base substrate and defining first intervals in a first direction and second intervals in a second direction, wherein the refractive protrusions have a first space ratio and a second space ratio;
the first space ratio is a ratio of a first lower base substrate length of each of the refractive protrusions along the first direction to a sum of the first lower base substrate length and the corresponding first interval;
the second space ratio is a ratio of a second lower base substrate length of each of the refractive protrusions along the second direction to a sum of the second lower base substrate length and the corresponding second interval; and
the first space ratio is greater than the second space ratio, and the first space ratio ranges from 0.5 to 1;
wherein the first intervals are larger than the second intervals.

9. The display panel according to claim 8, wherein the second space ratio ranges from 0.1 to 0.8.

10. The display panel according to claim 8, wherein a planar pattern of each of the refractive protrusions comprises a circular shape or an elliptical shape; and
each of the refractive protrusions having the elliptical shape comprises a major axis parallel to the second direction and a minor axis parallel to the first direction.

11. The display panel according to claim 8, wherein the base substrate is integrally formed with the refractive protrusions.

12. The display panel according to claim 8, wherein the refractive protrusions are arranged in an array on the base substrate.

13. The display panel according to claim 12, wherein a plurality of sets of the refractive protrusions are arranged along the second direction, and adjacent sets of the refractive protrusions comprise different numbers of the refractive protrusions.

14. The display panel according to claim 8, further comprising:
a protective layer arranged on the base substrate and the refractive protrusions.

* * * * *